United States Patent
Denton et al.

[11] Patent Number: 6,037,963
[45] Date of Patent: Mar. 14, 2000

[54] LASER PRINTER HAVING VARIABLE BEAM SPACING

[75] Inventors: Gary Allen Denton, Lexington; David Kurt Klaffenbach, Versailles, both of Ky.

[73] Assignee: Lexmark International, Inc., Lexington, Ky.

[21] Appl. No.: 09/123,845

[22] Filed: Jul. 28, 1998

[51] Int. Cl.[7] .................................................. B41J 2/455
[52] U.S. Cl. ........................... 347/233; 347/238; 347/131
[58] Field of Search .................... 347/131, 233, 347/238, 241, 246, 253, 254

[56] References Cited

U.S. PATENT DOCUMENTS

| | | | |
|---|---|---|---|
| 4,302,782 | 11/1981 | Gunning et al. | 358/296 |
| 4,905,025 | 2/1990 | Sakamoto et al. | 346/154 |
| 5,241,329 | 8/1993 | Guerin | 346/109 |
| 5,300,956 | 4/1994 | Ohta et al. | 346/107 |
| 5,305,022 | 4/1994 | Ota et al. | 346/108 |
| 5,347,303 | 9/1994 | Kovacs et al. | 346/157 |
| 5,430,472 | 7/1995 | Curry | 347/323 |
| 5,448,278 | 9/1995 | Tanimoto et al. | 347/129 |
| 5,471,236 | 11/1995 | Ito | 347/233 |
| 5,589,870 | 12/1996 | Curry et al. | 347/233 |
| 5,631,762 | 5/1997 | Kataoka | 359/204 |
| 5,638,107 | 6/1997 | Curry | 347/234 |
| 5,691,759 | 11/1997 | Hanson | 347/233 |
| 5,774,248 | 6/1998 | Komatsu | 347/233 |
| 5,818,488 | 10/1998 | Tanuma et al. | 347/131 |

*Primary Examiner*—John E. Barlow, Jr.
*Assistant Examiner*—Lamson D. Nguyen
*Attorney, Agent, or Firm*—John A. Brady

[57] ABSTRACT

A laser printer includes at least three laser beams for simultaneously scanning a rotatable recording medium. The laser beams have their centers spaced uniform or non-uniform distances from each other. The centers of the laser beams are spaced predetermined distances from each other so that the print resolution may be 300, 400, 600, or 1,200 dpi depending upon the laser beams selected for use with at least two laser beams always being selected.

18 Claims, 6 Drawing Sheets

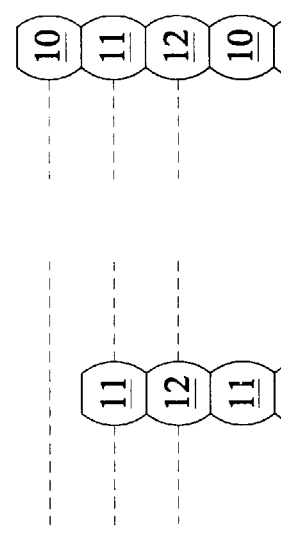
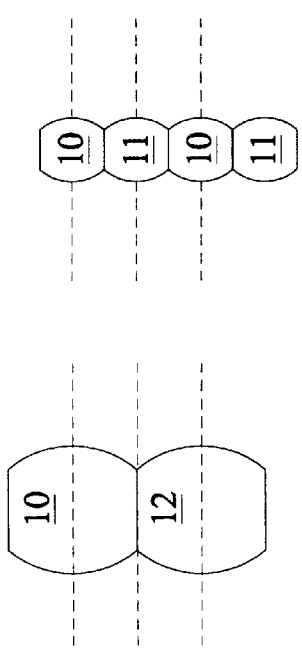
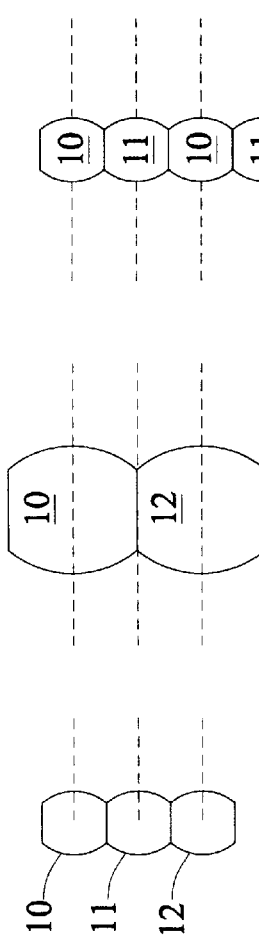
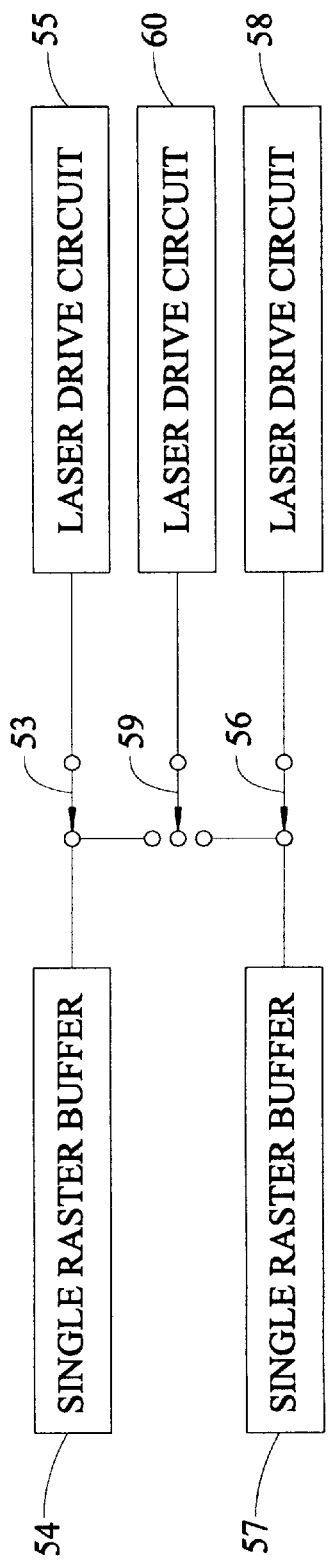

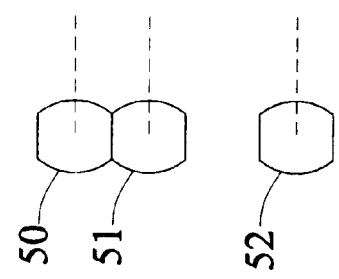
FIG. 3A
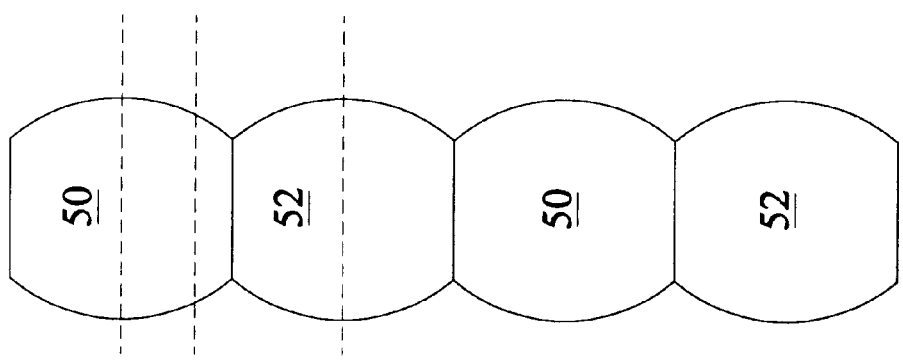
FIG. 3B
FIG. 3C
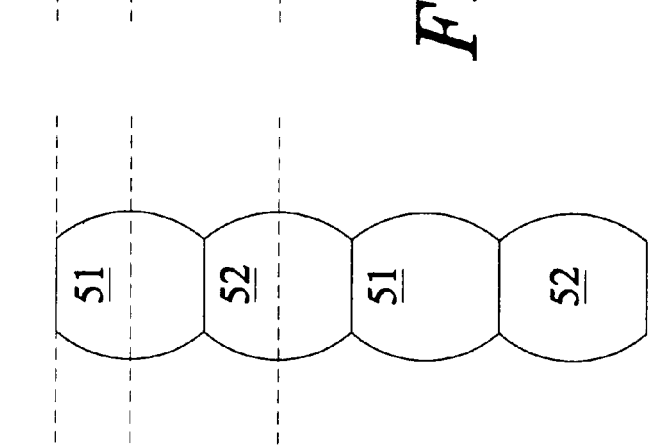
FIG. 3D

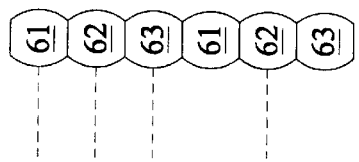
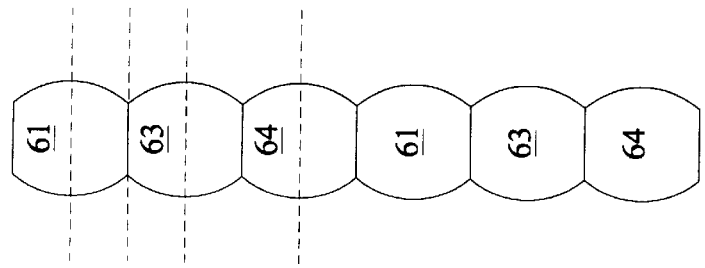
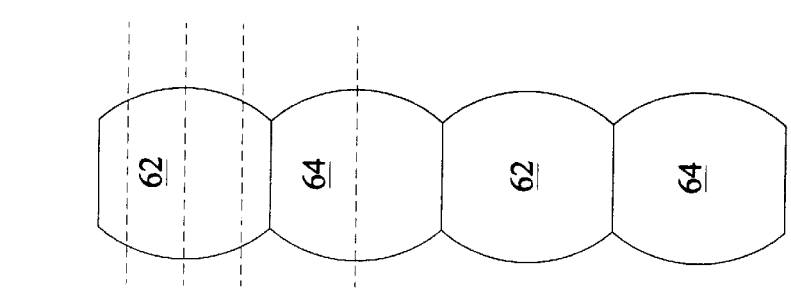
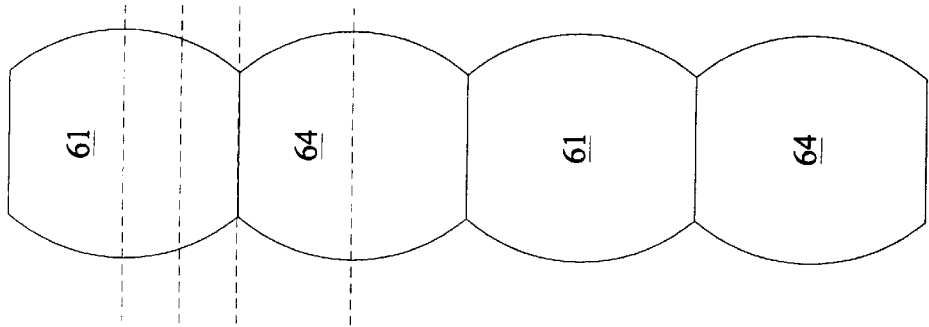
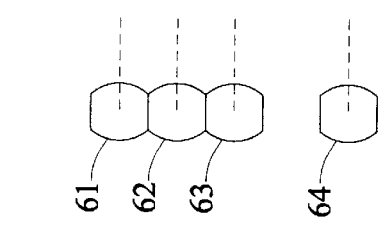

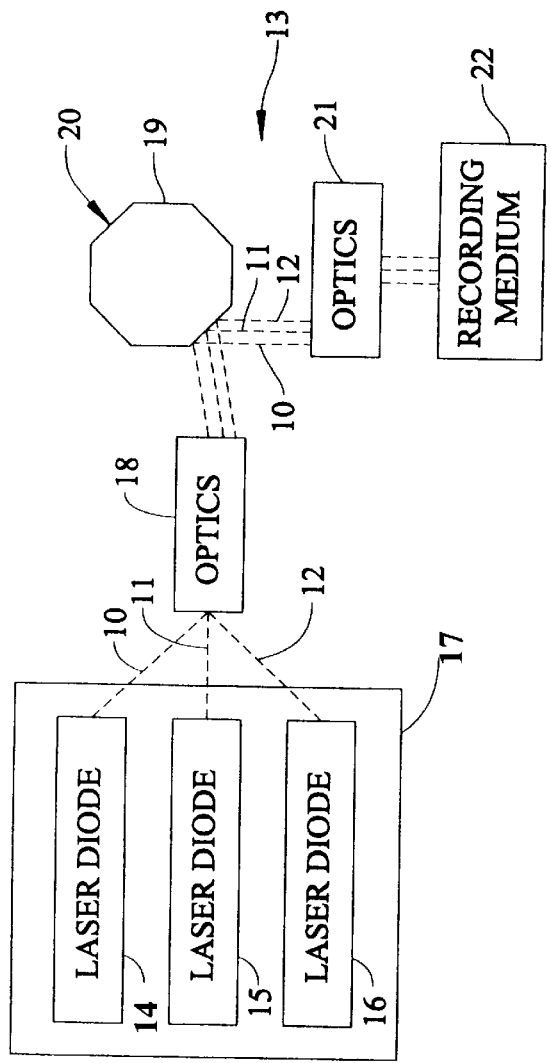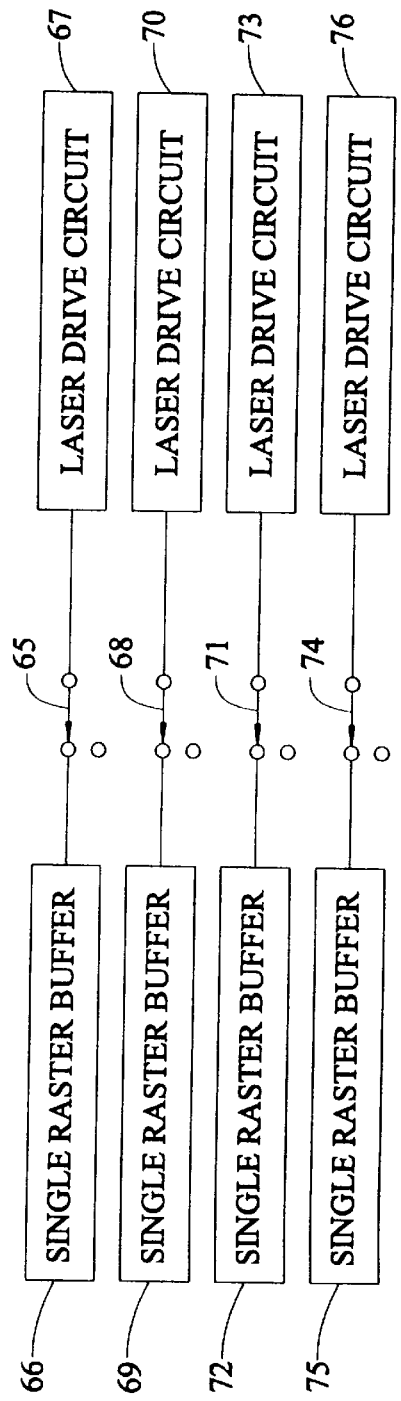

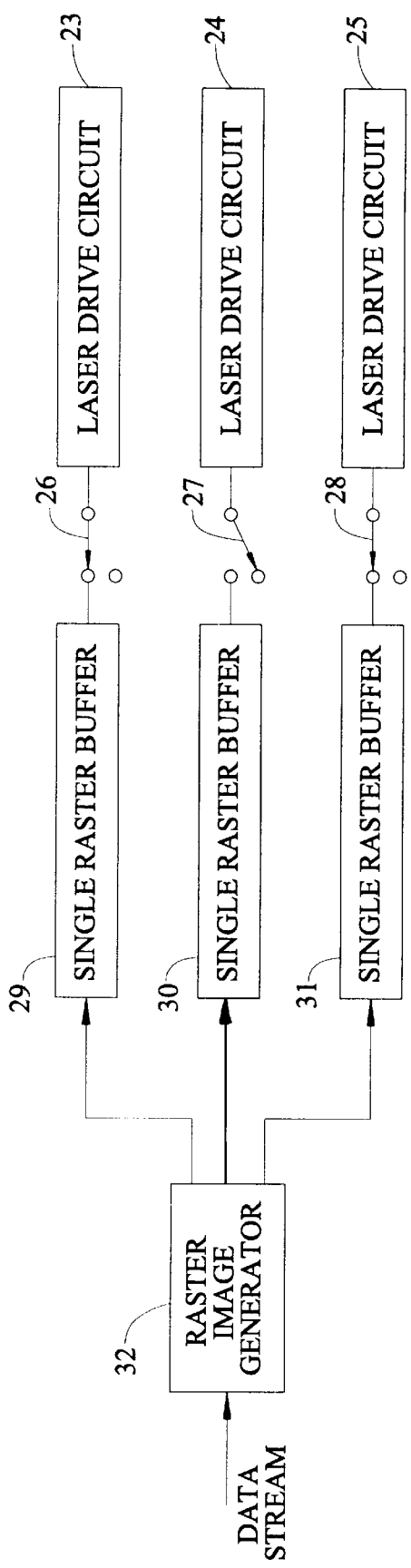
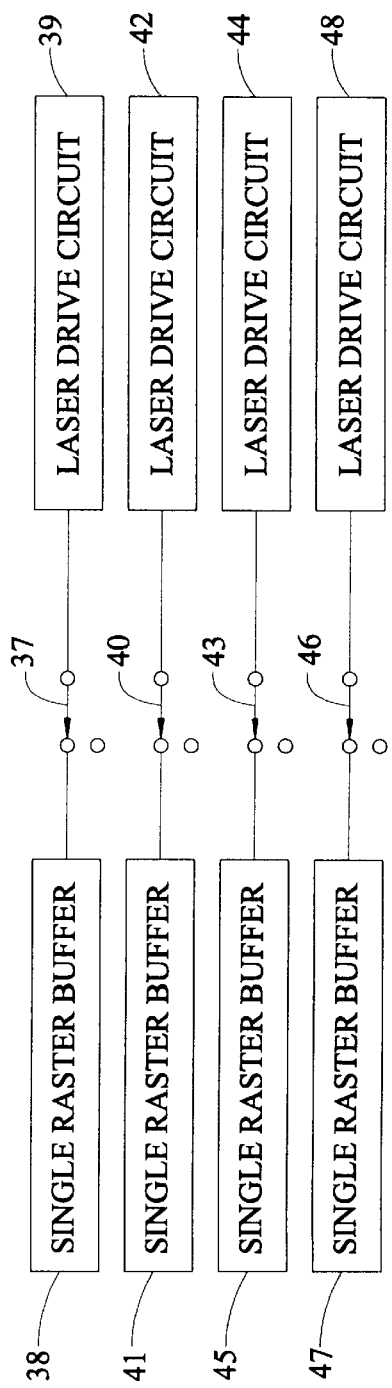

LASER PRINTER HAVING VARIABLE BEAM SPACING

FIELD OF THE INVENTION

This invention relates to a laser printer having a multiple beam printhead capable of switching between at least two print resolutions and, more particularly, to a laser printer in which switching between print resolutions is obtained without a significant reduction in print speed as is presently required.

BACKGROUND OF THE INVENTION

It has been previously suggested to have a single beam laser printer with the capability of switching its print resolution from 600 dots per inch (dpi) to 1,200 dpi, for example. Increasing the resolution of a single beam laser printer from 600 dpi to 1,200 dpi has necessitated reducing its print speed at 1,200 dpi to one-half of the print speed at 600 dpi. This print speed relation is based on the maximum mirror motor speed.

It also has previously been suggested to increase the throughput of a laser printer by using two beams to print two adjacent lines on a recording medium. This enables the throughput to be increased without requiring the speed of the mirror motor or the facets of the mirror to be increased.

When using a printhead with two laser beams, the distance between the centers of the two laser beams must be 42 microns for 600 dpi resolution and 21 microns for 1,200 dpi resolution. Therefore, if the dual laser beam printhead is to have its resolution changed from 600 dpi to 1,200 dpi, one of the two laser beams must be turned off, and the print speed must be reduced to one-fourth of the print speed of the 600 dpi resolution. This is because one of the two laser beams writes all of the odd numbered raster lines while the other of the two laser beams writes all of the even numbered raster lines. If one of the laser beams were not turned off and the print speed not reduced to one-fourth of the print speed at 600 dpi resolution, the even numbered raster scans would fall on top of the odd numbered raster scans at 1,200 dpi.

Thus, the increase in a dual beam laser printer resolution from 600 dpi to 1,200 dpi has necessitated reducing the print speed at 1,200 dpi to one-fourth of the print speed at 600 dpi. This is a significant reduction in print speed and is readily noticed by a user so as to not be satisfactory.

For example, a single beam laser printer might print at 24 pages per minute (ppm) at 600 dpi and 12 ppm at 1,200 dpi. A dual beam laser printer might print at 40 ppm at 600 dpi but only at 10 ppm at 1,200 dpi when operating at a print speed of only one-fourth of the 600 dpi print speed. Accordingly, a dual laser printer capable of printing at two resolutions would be at a commercial disadvantage with this significant reduction in print speed of 75% since its print speed at 1,200 dpi would be less than a single beam laser printer at 1,200 dpi.

SUMMARY OF THE INVENTION

The method and apparatus of the present invention satisfactorily overcome the foregoing problem by enabling a change in print resolution from 600 dpi to 1,200 dpi while reducing the print speed to only one-half of the 600 dpi print speed. This is accomplished by using a multiple laser beam printhead having at least three laser beams with at least two laser beams employed during each scan.

The three laser beams are preferably produced by three separate laser diodes supported by a semiconductor substrate. The spacings of the centers of the laser beams from each other are either 42 microns (the spacing required for 600 dpi) or 21 microns (the spacing required for 1,200 dpi) or an odd multiple thereof.

An object of this invention is to provide an improved throughput for a multiple beam laser printer operating at different print resolutions.

Another object of this invention is to provide a laser printer having at least three laser beams with their centers spaced selected, predetermined minimum distances from each other.

Other objects of this invention will be readily perceived from the following description, claims, and drawings.

BRIEF DESCRIPTION OF THE DRAWINGS

The attached drawings illustrate preferred embodiments of the invention, in which:

FIG. 1A is a schematic view showing the spaced relation of three uniformly spaced laser beams.

FIG. 1B is a schematic view showing the use of two of the three laser beams of FIG. 1A during two raster scans to produce a 600 dpi resolution.

FIG. 1C is a schematic view showing the use of one of the two laser beams of FIG. 1B and the third of the three laser beams of FIG. 1A during two raster scans to produce a 1,200 dpi resolution.

FIG. 1D is a schematic view showing the use of the other of the two laser beams of FIG. 1B and the third of the three laser beams of FIG. 1A during two raster scans to produce a 1,200 dpi resolution.

FIG. 1E is a schematic view showing the use of the three laser beams of FIG. 1A during two raster scans to produce a 1,200 dpi resolution.

FIG. 3A is a schematic view showing the spaced relation of three non-uniformly spaced laser beams.

FIG. 3B is a schematic view showing the use of two of the three laser beams of FIG. 3A during two raster scans to produce a 400 dpi resolution.

FIG. 3C is a schematic view showing the use of one of the two laser beams of FIG. 3B and the second of the laser beams of FIG. 3A during two raster scans to produce a 600 dpi resolution.

FIG. 3D is a schematic view showing the use of the other of the two laser beams of FIG. 3B and the second of the three laser beams of FIG. 3A during two raster scans to produce a 1,200 dpi resolution.

FIG. 4A is a schematic view showing the spaced relation of four non-uniformly spaced laser beams.

FIG. 4B is a schematic view showing the use of two of the four laser beams of FIG. 4A during two raster scans to produce a 300 dpi resolution.

FIG. 4C is a schematic view showing the use of one of the two laser beams of FIG. 4B and the second of the four laser beams of FIG. 4A during two raster scans to produce a 400 dpi resolution.

FIG. 4D is a schematic view showing the use of the two laser beams of FIG. 4B and the third of the four laser beams of FIG. 4A during two raster scans to produce a 600 dpi resolution.

FIG. 4E is a schematic view showing the use of the first, second and third and of the laser beams of FIG. 4A during two raster scans to produce a 1,200 dpi resolution.

FIG. 5 is a schematic block diagram showing three laser diodes producing three laser beams for simultaneously scanning a recording medium.

FIG. 6 is a schematic block diagram for selecting the specific laser beams of FIG. 1A to be used in each of FIGS. 1B–1E.

FIG. 7 is a schematic block diagram for selecting the specific laser beams of FIG. 2A to be used in each of FIGS. 2B–2G.

FIG. 8 is a schematic block diagram for selecting the specific laser beams of FIG. 3A to be used in each of FIGS. 3B–3D.

FIG. 9 is a schematic block diagram for selecting the specific laser beams of FIG. 4A to be used in each of FIGS. 4B–4E.

DETAILED DESCRIPTION OF PREFERRED EMBODIMENTS

Figure 2A:
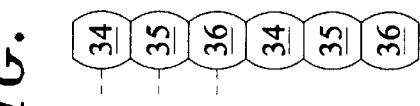
FIG. 2A is a schematic view showing the spaced relation of four uniformly spaced laser beams.

In FIGS. 1A through 4E laser beams (such as 10, 11 and 12) are shown by reference to their spot area for one pe1. The beam shape and sizes are suggestive only and not exact. However, each of those figures having the same numeral (such as FIG. 1A through FIG. 1E) are intended to be consistent with each other and to show relative sizes of the spots discussed. The dashed lines beginning at the center of the beam spot on the left indicates the center line of spots to the right in the drawing created by the same laser beam source as will be discussed in detail below.

Where the same laser beam source is to produce a spot of larger or smaller sizes, normally the effective area of the laser beam is changed. The may be accomplished by changing the laser beam power and by adjusting other parameters of the printing process available to a laser printer designer. In a particular instance, the laser beam passes through an aperture in the optical system and reaches the surface where a spot is made as an oval with optical power distributed in a bell-shaped curve centered around the oval. (This oval is moved laterally by reflection from a rotating mirror.) Increasing the power to the laser thereby increases the effective optical energy. Changing the size of the aperture would similarly increase or decrease the effective area for a larger or smaller aperture respectively. This invention is valid, although not practiced ideally, when the beam energy remains unchanged and is selected to be between the sizes desired or selected to be the size for a preferred resolution. In xerographic laser printing the toner tends to attach in such a way as to smooth abrupt changes in the optical pattern.

Referring to FIG. 1A, there are shown three laser beams 10, 11, and 12. The laser beams 10–12 have their centers uniformly spaced a distance of 21 microns (This is the required spacing for 1,200 dpi.) from each other.

The three laser beams 10–12 may be produced by any suitable laser beam producing mechanism of a laser printer 13 (see FIG. 5). For example, three laser diodes 14–16, which are preferably supported by a semiconductor substrate 17, produce the laser beams 10, 11, and 12, respectively. After passing through optics 18, the three laser beams 10–12 are reflected from one of a plurality of facets 19 of a rotating polygonal shaped mirror 20 through optics 21 to a recording medium 22 such as a rotatable photoconductor, for example.

Accordingly, each of the laser beams 10–12 is capable of simultaneously scanning the recording medium 22, which is a rotatable or endless driven drum or belt. At least two of the laser beams 10–12 are utilized during any raster scan across the recording medium 22.

The desired resolution of the image printed on the recording medium 22 determines the specific laser beams that are selected from the three uniformly spaced laser beams 10–12. Laser drive circuits 23 (see FIG. 6), 24, and 25 drive the laser diodes 14, 15, and 16, respectively, for the laser beams 10, 11, and 12, respectively, when activated. The positions of switches 26 (see FIG. 6), 27, and 28 control when the laser drive circuits 23, 24, and 25, respectively, are activated. Accordingly, the positions of the switches 26, 27, and 28 determine which two laser beams of the three laser beams 10 (see FIG. 2A), 11, and 12 are to be turned on for a specific raster scan of the recording medium 22 (see FIG. 5). It should be understood that the positions of the switches 26 (see FIG. 6), 27, and 28 are controlled by the engine controller of the laser printer 13 (see FIG. 5).

The switch 26 (see FIG. 6) connects a single raster buffer 29 to the laser drive circuit 23, the switch 27 connects a single raster buffer 30 to the laser drive circuit 24, and the switch 28 connects a single raster buffer 31 to the laser drive circuit 25. A data stream input is supplied to a raster image generator 32, which generates a single raster line for each of at least two of the three single raster buffers 29, 30, and 31 for each raster scan.

FIG. 6 shows the switch 26 connecting the buffer 29 to the laser drive circuit 23, the switch 28 connecting the buffer 31 to the laser drive circuit 25, and the switch 27 open so that the laser beams 10 (see FIG. 1B) and 12 are utilized in the two scans shown in FIG. 1B. The laser beams 10 and 12 have their centers spaced 42 microns apart; this is the distance necessary to simultaneously print on two adjacent lines of the recording medium 22 (see FIG. 5) at a print resolution of 600 dpi.

When the switches 26 (see FIG. 6) and 27 connect the buffers 29 and 30, respectively, to the laser drive circuits 23 and 24, respectively, and the switch 28 is open, the laser beams 10 (see FIG. 1C) and 11, which have their centers spaced 21 microns apart, simultaneously scan the recording medium 22 (see FIG. 5). This produces a print resolution of 1,200 dpi.

Similarly, if the switches 27 (see FIG. 6) and 28 connect the buffers 30 and 31, respectively, to the laser drive circuits 24 and 25, respectively, while the switch 26 is open, then the laser beams 11 (see FIG. 1D) and 12 are utilized to scan the recording medium 22 (see FIG. 5). Since the centers of the laser beams 11 (see FIG. 1A) and 12 are spaced 21 microns from each other, a 1,200 dpi resolution is produced on the recording medium (see FIG. 5) during each scan.

As shown in FIG. 1E, each of the three laser beams 10, 11, and 12 is utilized during each raster scan. Thus, each of the switches 26 (see FIG. 6), 27, and 28 connects the buffers 29, 30, and 31, respectively, to the laser drive circuits 23, 24, and 25, respectively. This is again at a 1,200 dpi resolution since the spacing between the adjacent centers of the three laser beams 10 (see FIG. 1E), 11, and 12 is 21 microns.

FIG. 2A discloses four laser beams 33, 34, 35, and 36 having their centers uniformly spaced 21 microns from each other. It should be understood that another of the laser diodes, which would be the same as the laser diodes 14 (see FIG. 5), 15, and 16, would be supported by the semiconductor substrate 17 to provide the fourth laser beam 36 (see FIG. 2A) for selective application to the recording medium 22 (see FIG. 5). This configuration of four uniformly spaced laser beams enables production of three different resolutions of 400 dpi, 600 dpi, and 1,200 dpi.

As shown in FIG. 7, a switch 37 connects a buffer 38 with a laser drive circuit 39 for the laser beam 33 (see FIG. 2A). A switch 40 (see FIG. 7) connects a single raster buffer 41 with a laser drive circuit 42 for the laser beam 34 (see FIG. 2A). A switch 43 (see FIG. 7) connects a laser drive circuit 44 for the laser beam 35 (see FIG. 2A) with a single raster buffer 45 (see FIG. 7). A switch 46 connects a single raster buffer 47 to a laser drive circuit 48 for the laser beam 36 (see FIG. 2A). The single raster buffers 38, 41, 44, and 47 have their inputs connected to the output of the raster image generator 32 (see FIG. 6).

Figure 2B:
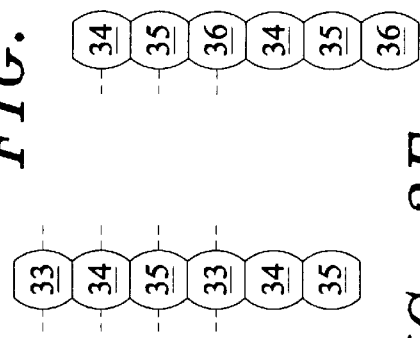
FIG. 2B is a schematic view showing the use of two of the four laser beams of FIG. 2A during two raster scans to produce a 400 dpi resolution.
Figure 2C:
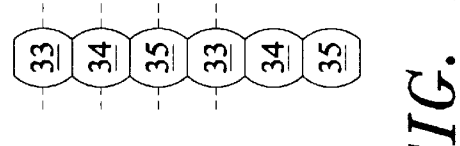
FIG. 2C is a schematic view showing the use of one of the laser beams of FIG. 2B and the third of the four beams of FIG. 2A during two raster scans to produce a 600 dpi resolution.
Figure 2D:
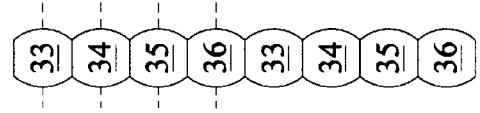
FIG. 2D is a schematic view showing the use of the other of the laser beams of FIG. 2B and the second of the four laser beams of FIG. 2A during two raster scans to produce a 600 dpi resolution.
Figure 2E:
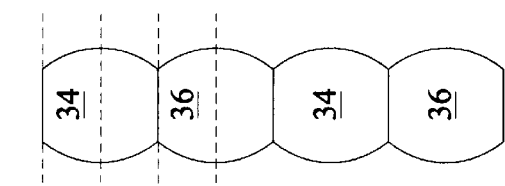
FIG. 2E is a schematic view showing the use of the four laser beams of FIG. 2A during two raster scans to produce a 1,200 dpi resolution.

In FIG. 2B, a 400 dpi resolution is produced by using only the laser beams 33 and 36, which have their centers spaced a distance of 63 microns (the distance between the centers of dots at a 400 dpi resolution). When a 600 dpi resolution is desired with the four uniformly spaced laser beams 33–36 of FIG. 2A, either the laser beams 33 (see FIG. 2C) and 35 or the laser beams 34 (see FIG. 2D) and 36 are selected since these have a spacing of 42 microns between the centers.

When the laser beams 33 (see FIG. 2C) and 35 are to be utilized, the switch 37 (see FIG. 7) connects the buffer 38 to the laser drive circuit 39, and the switch 43 connects the buffer 41 to the laser drive circuit 44. When the laser beams 34 (see FIG. 2D) and 36 are to be utilized, the switch 40 (see FIG. 7) connects the buffer 41 to the laser drive circuit 42, and the switch 46 connects the buffer 47 to the laser drive circuit 48.

Figure 2F:
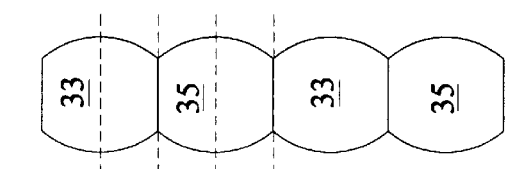
FIG. 2F is a schematic view showing the use of the two laser beams of FIG. 2C and the second laser beam of FIG. 2A during two raster scans to produce a 1,200 dpi resolution.
Figure 2G:
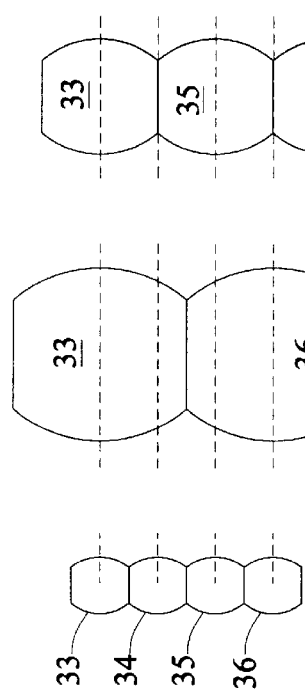
FIG. 2G is a schematic view showing the use of the two laser beams of FIG. 2D and the third laser beam of FIG. 2A during two raster scans to produce a 1,200 dpi resolution.

When a 1,200 dpi resolution is desired, the laser beams 33, 34, 35 and 36 (see FIG. 2E), the laser beams 33, 34, and 35 (see FIG. 2F), or the laser beams 34, 35 and 36 (see FIG. 2G) may be employed. When the four laser beams 33–36 are employed, four scan lines are produced on the recording medium 22 (see FIG. 5). When the three laser beams 33–35 are utilized as shown in FIG. 2F, three scan lines are produced on the recording medium 22 (see FIG. 5). Similarly, three scan lines are produced on the recording medium 22 (see FIG. 5) when the laser beams 34–36 are used as shown in FIG. 2G.

It should be understood that the laser beams 33 (see FIG. 2A) and 34 or the laser beams 34 and 35 or the laser beams 35 and 36 also may be utilized to produce a 1,200 dpi resolution. Each of these two beam arrangements would produce two scan lines on the recording medium 22 (see FIG. 5).

Laser beams 50 (see FIG. 3A) and 51 have their centers spaced 21 microns from each other. A third laser beam 52 has its center spaced 42 microns from the center of the laser beam 51. Accordingly, the three laser beams 50–52 are not uniformly spaced, and only two of the three laser beams 50–52 are utilized at any time.

When a 400 dpi resolution is desired, the laser beams 50 and 52 are selected because their centers are spaced 63 microns from each other. Thus, a switch 53 (see FIG. 8) connects a buffer 54 to a laser drive circuit 55 for the laser beam 50 (see FIG. 3B). A switch 56 (see FIG. 8) connects a buffer 57 with a laser drive circuit 58 for the laser beam 52 (see FIG. 3B). At this time, a switch 59 (see FIG. 8), which is connected to a laser drive circuit 60 for the laser beam 51 (see FIG. 3A), is not connected to either of the buffers 54 (see FIG. 8) and 57.

When a 600 dpi resolution is desired, the laser beams 51 (see FIG. 3C) and 52 are selected. The centers of the laser beams 51 and 52 are spaced 42 microns from each other. When the laser beams 51 and 52 are employed to scan the recording medium 22 (see FIG. 5), the switch 59 (see FIG. 8) connects the buffer 54 to the laser drive circuit 60, and the switch 56 connects the buffer 57 to the laser drive circuit 58. The switch 53 is open.

When a 1,200 dpi resolution is desired, the laser beams 50 (see FIG. 3D) and 51 are selected to scan the recording medium 22 (see FIG. 5). The centers of the laser beams 50 (see FIG. 3D) and 51 are spaced 21 microns from each other to produce the 1,200 dpi resolution.

When the laser beams 50 and 51 are employed, the switch 53 (see FIG. 8) connects the buffer 54 to the laser drive circuit 55, and the switch 59 connects the buffer 57 to the laser drive circuit 60. At this time, the switch 56 is open. Thus, the laser drive circuits 55 and 60 for the laser beams 50 (see FIG. 3D) and 51, respectively, are controlled by the buffers 54 (see FIG. 8) and 57, respectively.

FIG. 4A has a non-uniformly spaced four laser beam configuration in which two laser beams 61 and 62 have their centers spaced 21 microns from each other. The laser beam 62 also has its center spaced 21 microns from the center of a laser beam 63. The centers of the laser beam 63 and a laser beam 64 are spaced 42 microns from each other.

This laser beam arrangement enables a 300 dpi resolution to be produced by the laser beams 61 (see FIG. 4B) and 64. The centers of the laser beams 61 and 64 are spaced 85 microns. This value of 85 microns is due to the spacing being slightly greater than 21 microns from one another so that four of them exceed 84 microns.

As shown in FIG. 9, a switch 65 connects a buffer 66 to a laser drive circuit 67 for the laser beam 61 (see FIG. 4A) when the laser beam 61 is to be used. When the laser beam 62 is to be employed, a switch 68 (see FIG. 9) connects a buffer 69 to a laser drive circuit 70 for the laser beam 62 (see FIG. 4A). When the laser beam 63 is to be employed, a switch 71 (see FIG. 9) connects a buffer 72 to a laser drive circuit 73 for the laser beam 63 (see FIG. 4A). When the laser beam 64 is utilized, a switch 74 connects a buffer 75 to a laser drive circuit 76 for the laser beam 64 (see FIG. 4A). Thus, the buffers 66 (see FIG. 9) and 75 are utilized when the laser beams 61 (see FIG. 4B) and 64 are to scan the recording medium 22 (see FIG. 5).

When a 400 dpi resolution is to be produced, the switches 68 (see FIG. 9) and 74 are closed so that the laser beams 62 (see FIG. 4C) and 64 are used. The centers of the laser beams 62 and 64 are spaced 63 microns from each other.

When a 600 dpi resolution is desired, the switches 65 (see FIG. 9), 71, and 74 are closed so that the laser beams 61 (see FIG. 4D), 63, and 64 are utilized during each scan across the recording medium 22 (see FIG. 5). The centers of the laser beams 61 (see FIG. 4D) and 63 are spaced 42 microns from each other as are the centers of the laser beams 63 and 64.

When a 1,200 dpi resolution is desired, the laser beams 61 (see FIG. 4E), 62, and 63 are employed during a single scan across the recording medium 22 (see FIG. 5) through the switches 65 (see FIG. 9), 68, and 71 being closed. The centers of the laser beams 61 (see FIG. 4E) and 62 are spaced 21 microns from each other as are the centers of the laser beams 62 and 63. This produces the desired 1,200 dpi resolution. It should be understood that the laser beams 61 and 62 or the laser beams 62 and 63 also may be used to produce the desired 1,200 dpi resolution.

It should be understood that the number of the single raster buffers depends upon the maximum number of the laser beams used simultaneously during a raster scan. Thus, the laser beams 33 (see FIG. 2A), 34, 35, and 36 require the four buffers 38 (see FIG. 7), 41, 45, and 47. Likewise, the laser beams 61 (see FIG. 4A), 62, 63, and 64 require the four buffers 66 (see FIG. 9), 69, 72, and 75. Only the two buffers 54 (see FIG. 8) and 57 are needed with the three laser beams 50 (see FIG. 3A), 51, and 52 since only two of these three laser beams are ever utilized in a raster scan.

It also should be understood that the number of the laser drive circuits could be reduced to the number of the single raster buffers. This may be accomplished by arranging the switching between the laser drive circuits and the laser beams rather than between the laser drive circuits and the single raster buffers. For example, this arrangement would enable the use of only two of the three laser drive circuits 23–25 (see FIG. 5).

It should be further understood that each of the laser beams 10 (see FIG. 1A), 11, 12, 33 (see FIG. 2A), 34, 35, 36, 50 (see FIG. 3A), 51, 52, 61 (see FIG. 4A), 62, 63, and 64 may have the effective size of its spot, as measured at the site printed on the recording medium 22 (see FIG. 5), adjusted. This may be accomplished by changing the laser beam power and by adjusting other parameters of the printing process available to a laser printer designer.

While at least four laser beams have been shown and described for printing desired print resolutions, it should be understood that more than four of the laser beams may be employed, if desired.

An advantage of this invention is that it allows a multiple beam laser printer to be switched between two or more print resolution modes without using optical techniques while not reducing process speed too greatly.

For purposes of exemplification, preferred embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A laser printer in which a plurality of laser beams is generated for simultaneously scanning a recording medium to produce an image thereon at at least a first print resolution and a second print resolution, said first and said second print resolutions being different print resolutions including:

at least three laser beams having their centers separated predetermined distances from each other with at least two of the laser beams having their centers separated from each other a predetermined distance necessary to produce said first print resolution and with at least two of the laser beams having their centers separated from each other a predetermined distance necessary to produce said second print resolution;

and means to select laser drive circuits to control at least two of said laser beams to be used during each scan in accordance with each of said first and said second print resolutions of the image to be produced on the recording medium.

2. The laser printer according to claim 1 in which the laser beams have their centers spaced uniform distances from each other.

3. The laser printer according to claim 2 in which there are at least four laser beams.

4. The laser printer according to claim 1 in which the laser beams have their centers spaced non-uniform distances from each other.

5. The laser printer according to claim 4 in which there are at least four laser beams.

6. The laser printer according to claim 1 in which there are at least four laser beams.

7. A method for selecting at least two of at least three laser beams simultaneously scanning a recording medium to produce an image thereon at at least a first print resolution and a second print resolution, said first and said second print resolutions being different print resolutions of the image on the recording medium including:

defining the desired spacing of the centers of the laser beams from each other to produce at least two different print resolutions with at least two of the laser beams having their centers separated from each other a predetermined distance necessary to produce said first desired print resolution and with at least two of the laser beams having their centers separated from each other a predetermined distance necessary to produce said second print resolution;

and selecting laser drive circuits to control at least two of the laser beams for use during each scan to produce each of said first and said second print resolutions of the image on the recording medium.

8. The method according to claim 7 in which the centers of the laser beams are spaced uniform distances from each other.

9. The method according to claim 8 in which there are at least four laser beams.

10. The method according to claim 7 in which the centers of the laser beams are spaced non-uniform distances from each other.

11. The method according to claim 10 in which there are at least four laser beams.

12. The method according to claim 7 in which there are at least four laser beams.

13. A laser printer including:

means for producing at least three laser beams for simultaneously scanning a recording medium to produce an image thereon with at least two of the laser beams being used during each scan;

the laser beams having their centers spaced predetermined distances from each other with at least two of the laser beams having their centers spaced from each other a predetermined distance necessary to produce a first print resolution and with at least two of the laser beams having their centers separated from each other a predetermined distance necessary to produce a second print resolution, said first print resolution and said second print resolution being different print resolutions;

and means for selecting laser drive circuits to control at least two of the laser beams to be used during each scan in accordance with the spacing between their centers to produce at least two different print resolutions of the image on the recording medium.

14. The laser printer according to claim 13 in which the laser beams have their centers spaced uniform distances from each other.

15. The laser printer according to claim 14 in which there are at least four laser beams.

16. The laser printer according to claim 13 in which the laser beams have their centers spaced non-uniform distances from each other.

17. The laser printer according to claim 16 in which there are at least four laser beams.

18. The laser printer according to claim 13 in which there are at least four laser beams.

* * * * *